United States Patent
Chiang et al.

(10) Patent No.: US 6,896,372 B2
(45) Date of Patent: May 24, 2005

(54) OFF-AXIS IMAGE PROJECTING SYSTEM

(75) Inventors: Po-Liang Chiang, Taipei (TW); Yi-Wei Liu, Tucheng (TW)

(73) Assignee: United Microelectronics Corp., Hsinchu (TW)

(*) Notice: Subject to any disclaimer, the term of this patent is extended or adjusted under 35 U.S.C. 154(b) by 0 days.

(21) Appl. No.: 10/657,016

(22) Filed: Sep. 4, 2003

(65) Prior Publication Data

US 2005/0052624 A1 Mar. 10, 2005

(51) Int. Cl.$^7$ .................. G03B 21/00; G03B 21/20; G03B 21/26; G03B 21/28
(52) U.S. Cl. .................. 353/31; 353/20; 353/34; 353/37; 353/99
(58) Field of Search .................. 353/20, 31, 34, 353/37, 98, 99, 102; 348/742, 743, 771; 349/5, 6, 7, 8

(56) References Cited

U.S. PATENT DOCUMENTS

| | | | | |
|---|---|---|---|---|
| 5,555,041 A | * | 9/1996 | Manabe | 353/98 |
| 6,076,931 A | * | 6/2000 | Bone et al. | 353/100 |
| 6,652,105 B1 | * | 11/2003 | Peterson et al. | 353/98 |
| 6,688,748 B2 | * | 2/2004 | Lewis et al. | 353/69 |

OTHER PUBLICATIONS

"Merriam–Webster's Collegiate Dictionary, Tenth Edition", copyright 2001, p. 800.*

* cited by examiner

*Primary Examiner*—David Gray
*Assistant Examiner*—Melissa J Koval
(74) *Attorney, Agent, or Firm*—J.C. Patents

(57) ABSTRACT

An off-axis image projecting system at least has an illumination source, a reflective displaying device, a projecting lens set, and a first plate. The illumination source emits an illuminating beam. The reflective displaying device can modulate the illuminating beam to form a reflected image-formation beam. The projection lens set has a light path. The reflected image-formation beam enters the projecting lens set, and the first plate is disposed on the light path between the projecting lens set and the reflective displaying device. The illuminating beam from the illuminating source is incident onto the first plate, and then the first plate reflects the illuminating beam to the reflective displaying device by a non-zero incident angle. The reflected image-formation beam can travel through first plate and enter the projection lens set.

6 Claims, 3 Drawing Sheets

OFF-AXIS IMAGE PROJECTING SYSTEM

BACKGROUND OF THE INVENTION

1. Field of Invention

The present invention relates to an image projecting system. More particularly, the present invention relates to an off-axis image projecting system, which has low fabrication cost and high image quality.

2. Description of Related Art

The image projecting system based on reflection type liquid crystal display (LCD) device usually is categorized into on-axis image projecting system and off-axis projecting system. Wherein, with respect to the on-axis image projecting system, both the illuminating beam and the image-formation beam are traveling along the same path. In this situation, it is necessary to implement a polarization splitter on the path. However, it has several issues for the polarization splitter that the fabrication is rather difficult and expensive, and the projecting system occupies a large space. In comparison with the off-axis image projection system, the illuminating beam and the image-formation beam are traveling along different paths. This can prevent the issues to implement the polarization splitter.

FIG. 1 is a drawing, schematically illustrating a conventional off-axis image projecting system. In FIG. 1, for convenience in descriptions, only the green channel is shown. The off-axis image projection system includes am illuminating source 102, an X plate formed by two color screen plates 150(r) and 150(b), a polarizing plate 104(r, g, b), a field lens 140(r, g, b), a reflective displaying device 108(r, g, b), an analyzer 110(r, g, b), a color cube 160, and a projecting lens set 114. The illuminating source 102 can produce a white light beam, which is split into red, green, and blue components when passing the X plate. The green light is shown in FIG. 1 as the example. The illuminating beam 116(g) travels through the polarizing plate 104(g) and along the light path 118(g) to be incident onto the reflective displaying device 108(g) by a non-vertical incident angle. After the light beam 116(g) is modulated by the reflective displaying device 108(g) and is reflected, an image-formation beam 120(g) is formed. This image-formation beam 120(g) travels along the light path 122(g) through the field lens 140(g), the analyzer 110(g) and color cube 160, and then reaches to the projecting lens set 114 and is reflected. The red and blue light beams (not shown) are also respectively travel through the polarizing plate 104(r, b), the reflective displaying device 108(r, b), the field lens 108(r, b), the analyzer 110(r, b), and the color cube 160, and then reach to the projecting lens set 114 and are reflected. After the image-formation beams 120(r, g, b) in three colors are combined by the color cube 160, they enter the projecting lens set 114.

However, in the foregoing off-axis image projection system, since the light path 118(r, g, b) of the illuminating beam and the light path 122(r, g, b) of the image-formation beam are not at the same path, with respect to the axis direction of the color cube 160 and the projecting lens set 114, the reflective displaying device 108(r, g, b) and the color cubic are not parallel but have an angle. In this manner, the light cone angle for entering the reflective displaying device 108(r, g, b) is relatively large and asymmetric, causing a difficulty to adjust aberration, image clearness, dispersion of pixels, uniformity, and contrast. In order to solve the foregoing problems, when the lens is designed, a projection lens set is added to planar plate 130. In this manner, it increases the difficulty in lens design and the installation. The fabrication cost for forming the lens increases.

In addition, in the foregoing off-axis image projection system, since the reflective displaying device 108(r, g, b) and the color cube 160 are not parallel, and the incident light beam 116(g) travels through the X plate by a tilt angle. The X plate needs to coat the films in two axis directions. However, it is also difficult to fabricate the X plate. The fabrication cost is then high.

SUMMARY OF THE INVENTION

The invention provides an off-axis image projection system, in which the fabrication difficulty and cost can be effectively reduced.

The invention provides an off-axis image projection system, in which the image quality can be effectively improved.

The invention provides an off-axis image projection system, in which the volume of the off-axis image projection system can be reduced.

The invention provides an off-axis image projection system, at least including an illumination source, a reflective displaying device, a projecting lens set, and a first plate. The illumination source emits an illuminating beam. The reflective displaying device can modulate the illuminating beam to form a reflected image-formation beam. The reflected image-formation beam enters the projecting lens set along a light path, and the first plate is disposed on the light path between the projecting lens set and the reflective displaying device. The illuminating beam from the illuminating source is incident onto the first plate, and then the first plate reflects the illuminating beam to the reflective displaying device by a non-zero incident angle. The reflected image-formation beam can travel through first plate and enter the projection lens set.

In addition, with respect to the off-axis image projection system in color, the off-axis image projection system can further include a plurality of reflective displaying devices, a color splitter, a color combination device and a plurality of first plates. The reflective displaying devices are respectively related to the color illuminating beams. By modulating the related color illuminating beams, a plurality of color image-formation beams in relation are formed. The color splitter is implemented between the illuminating source and the reflective displaying devices. The illuminating source is split by the color splitter to have the color illuminating beams, which are respectively incident onto the related reflective displaying devices. The color combination device is implemented between the reflective displaying devices and the projection lens set, wherein the color combination device can combine the color image-formation beams to form the reflected image-formation beam. The first plates are respectively disposed on the related light path between the projection lens set and the reflective displaying device. The color image-formation beams, split by the color splitter, are respectively incident to the related first plates, and then the first plates reflect the color image-formation beams to the related reflective displaying devices by a non-zero incident angle. The color image-formation beams can respectively travel through the first plates and enters the color combination device.

Moreover, in the foregoing color off-axis image projection system, it can further include a plurality of second plates, which are respectively implemented between the color splitter and the related reflective displaying devices.

The second plates allow the illuminating beam to be incident to the color splitter by perpendicular incidence. In addition, the split color illuminating beams are respectively incident to the related second plates and reflected to the related first plates.

Also and, in the foregoing off-axis image projection system, the first plate and the related light path form an angle by a ranges of greater than −45° and less than 0° as well greater than 0° and less than 45°.

The invention also provides an off-axis image projection system, at least including an illumination source, a plurality of reflective displaying devices, a projecting lens set, a color splitter, a color combination device, and a plurality of plate sets. The illumination source emits an illuminating beam. The reflective displaying devices are respectively related to the color illuminating beams. By modulating the related color illuminating beams, a plurality of color image-formation beams in relation. There is a light path between each of the projecting lens set and the reflecting-type displaying device. The color splitter is implemented between the illuminating source and the reflecting-type displaying device. The light beam form the illuminating source is split by the color splitter to have color illuminating beams, which are respectively incident to the related reflecting-type displaying device. The color combination device is implemented between the reflecting-type displaying device and the projecting lens set. The color combination device can combine the color image-formation beams into an image-formation beam and enter the projecting lens along light path. The plate sets are respectively implemented between the color splitter and the reflecting-type displaying device. The plate sets allow the illuminating beam to be incident the color splitter by perpendicular incidence. The split color illuminating beams are respectively incident to the related plate sets. The plate sets then respectively reflect the beam to the reflective displaying device by a non-zero incident angle.

In addition, in the foregoing off-axis image projection system, each of the plate sets includes a first plate and a second plate. The color illuminating beams are respectively enters the related second plates and reflected to the related first plates. The first plates then reflect the beam to the reflective displaying device.

According to the foregoing descriptions, the first plate is implemented between the reflective displaying device and the projecting lens set. The illuminating beam is incident to the first plate and is reflected to the reflective displaying device, so that the light cone angle for the illuminating beam to enter the reflective displaying device is further reduced. This can solve the issues of aberration, image clarity, pixel dispersion, brightness uniformity, and contrast, and further improve the image quality.

In addition, since the first plate is implemented between the reflective displaying device and the projecting lens set, and the first plate is disposed on the light path of the image-formation beam, the first plate can effectively reduce the aberration in the image-formation beam.

In addition, the first plate is implemented on the light path between the reflective displaying device and the projecting lens set. Since it is not difficult to fabricate the first plate between the reflective displaying device and the projecting lens set, and it is not necessary to assemble the plate in the projecting lens set, the lens design and fabrication for the projecting lens set is rather easy. The fabrication cost is then reduced.

Further still, since the invention implements the first plate on the light path between the reflective displaying device and the projecting lens set, the amplification power of the field lens can be reduced. The variation of amplification power at the corner of image can be then reduced. This allows the adjustment at the corner of image to be easily done.

Further still, the invention implements the plate set, such as the first plate and the second plate, on the light path between the reflective displaying device and the projecting lens set. Due to the plate set, the illuminating beam can be adjusted to be perpendicularly incident to a plane of the X plate. As a result, the process of grading coating film on the X plate only needs the coating film in a single axis direction. This makes the fabrication of the X plate to be easier and the cost to be reduced.

Further still, the invention implements the plate set between the reflective displaying device and the projecting lens set. Due to the plate set, the light path of the illuminating beam in the direction perpendicular to the image projection system can be folded. This allows the volume of the image projection system to be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
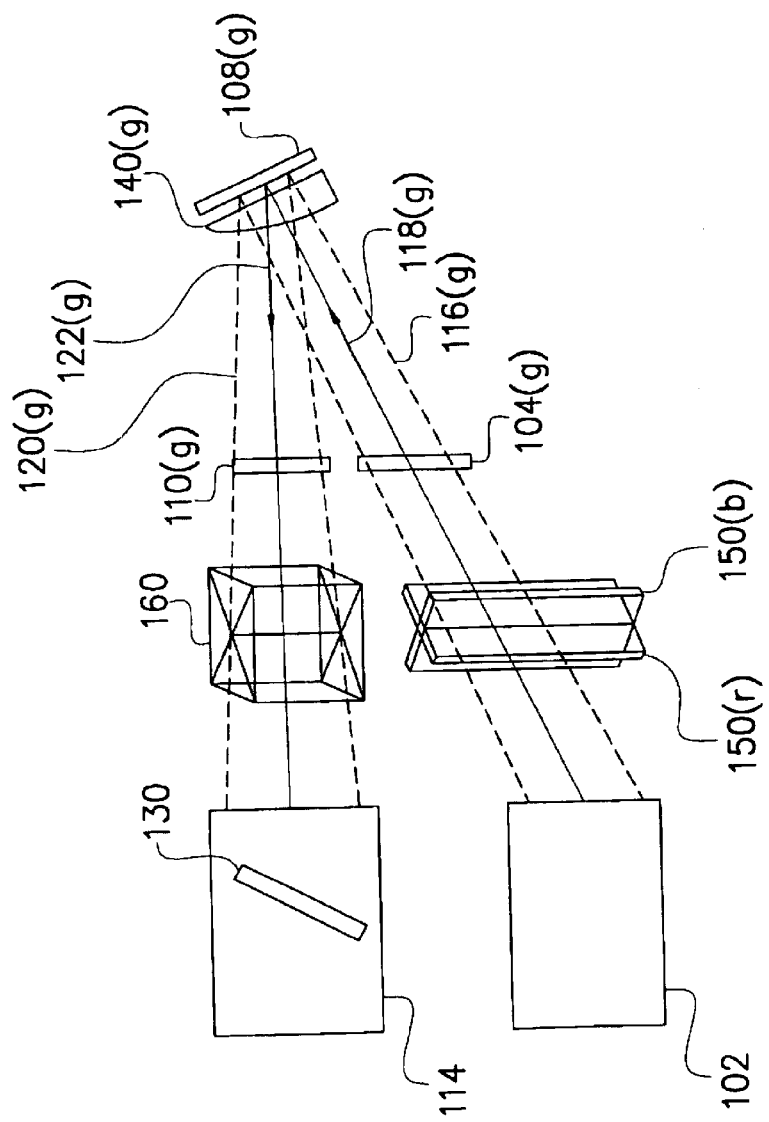
FIG. 1 is a drawing, schematically illustrating a conventional off-axis image projecting system in green channel.
Figure 2:
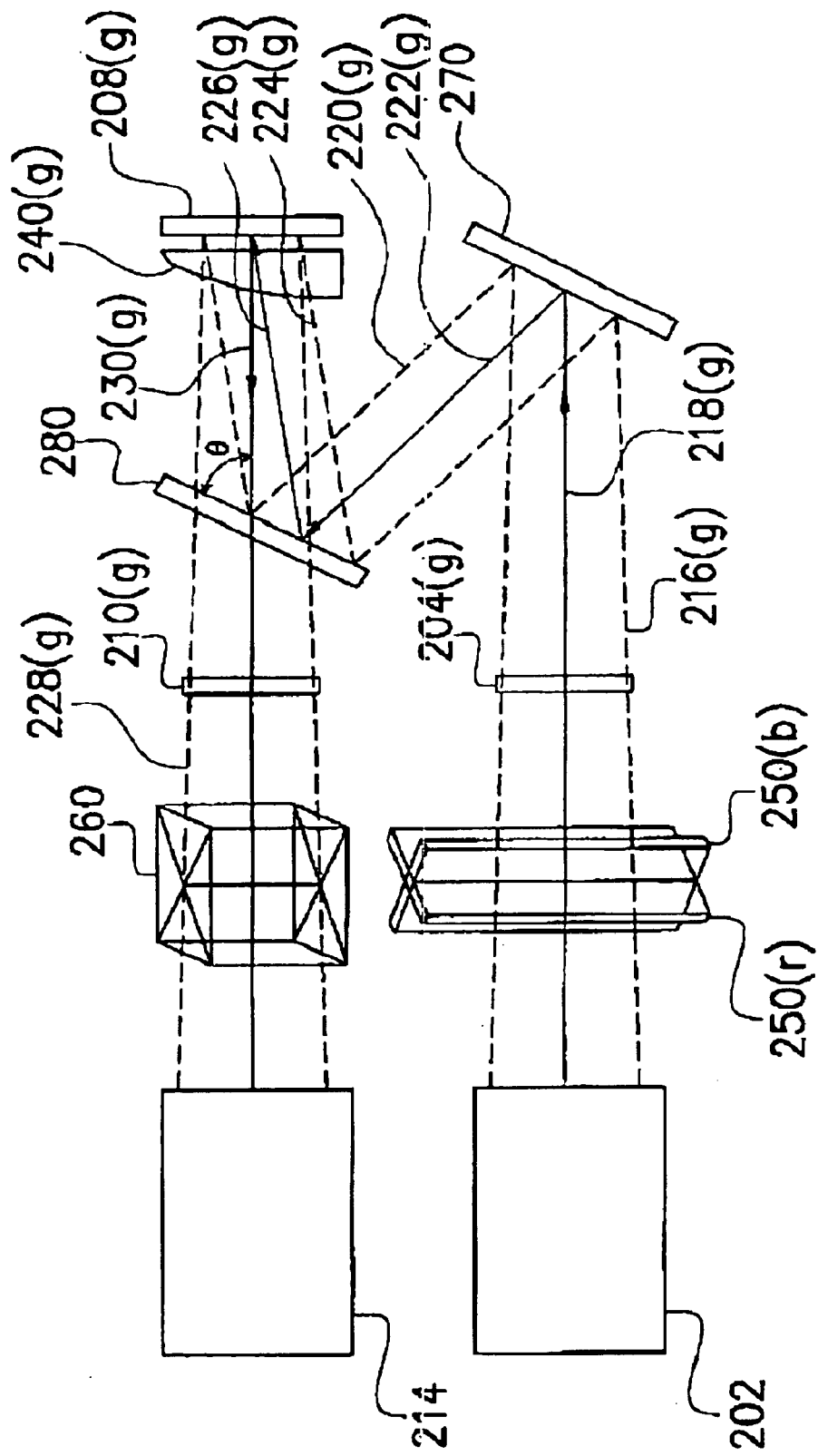
FIG. 2 is a drawing, schematically illustrating an off-axis image projecting system in green channel, according to one preferred embodiment of this invention.
Figure 3:
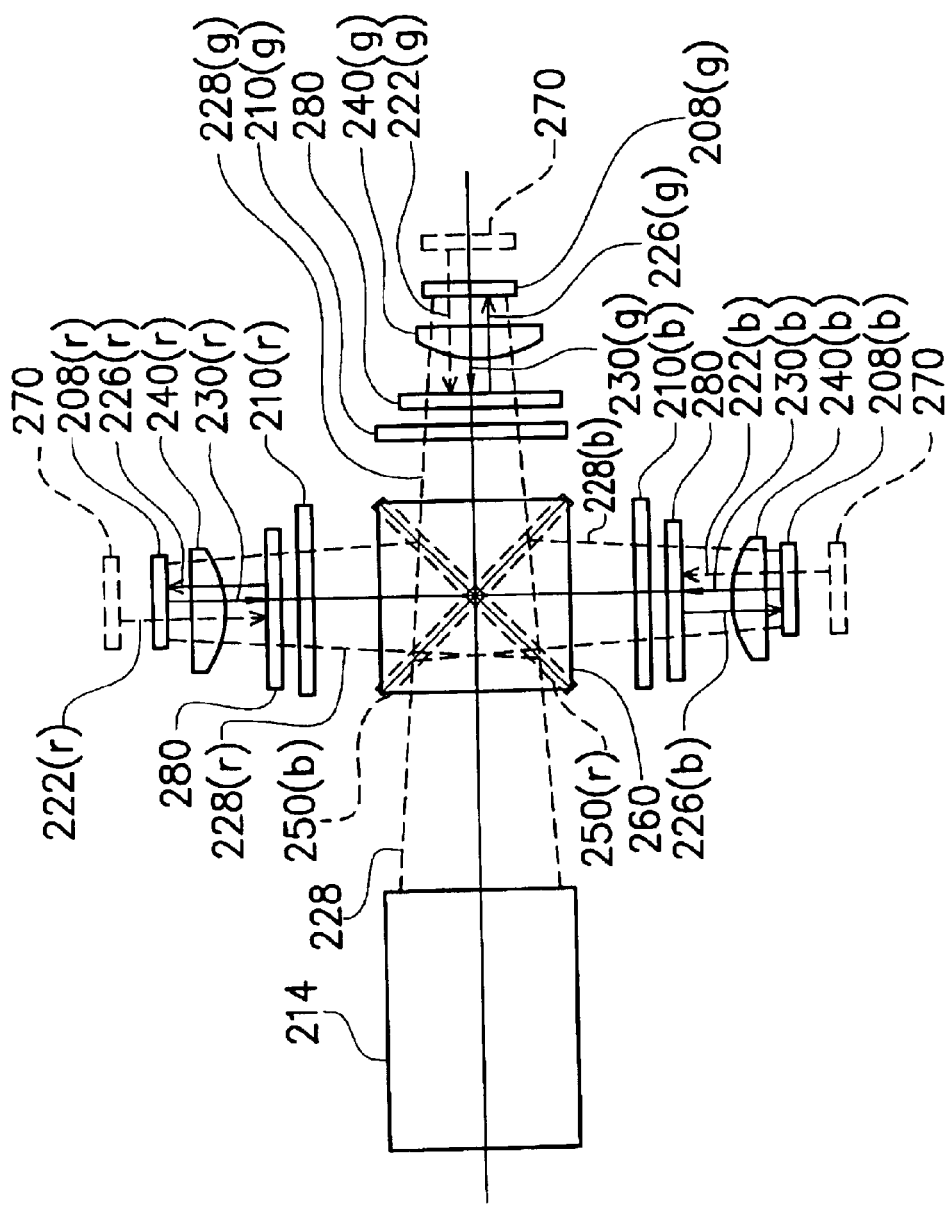
FIG. 3 is a drawing in top view, schematically illustrating an off-axis image projecting system with full channels, according to one preferred embodiment of this invention.

FIG. 2 is a drawing, schematically illustrating an off-axis image projecting system in green channel, according to one preferred embodiment of this invention FIG. 3 is a drawing in top view, schematically illustrating an off-axis image projecting system with full channels, according to one preferred embodiment of this invention. The off-axis image projection system at least includes an illuminating source 202, an X plate 250 serving as a color splitter, plates 270 and 280, a field lens 240(r, g, b), an reflective displaying device 208, color cube 260 serving as a color combination device, and a projecting lens set 214.

In FIG. 2 and FIG. 3, the illuminating source 202 can emit an illuminating beam 216, which travels along a light path 218 through the X plate 250.

The X plate 250 is composed of a dichromatic screen plate, such as the green screen plate 250(r) and the blue screen plate 250(b), so as to split the illuminating beam 216 into red, green, and blue components to form the illuminating beams 216(r, g, b). Then, the illuminating beams 216(r, g, b), split by the X plate 250, respectively travel along the light paths 218(r, g, b) and reach to the plate 270.

In addition, a polarizing plate 204(r, g, b) can be implemented on the light path 218(r, g, b) between the X plate 250 and the plate 270. The polarizing plate 204(r, g, b) is used to linearly polarize the illuminating beam 216(r, g, b) to a first polarizing state with respect to the transmission axis of the polarizing plate 204(r, g, b).

The plate 270 reflects the illuminating beam 216(r, g, b), which has the first polarizing state, and is formed by, for example, a polarizing plate or other material being able to reflect the illuminating beam 216(r, g, b).

It should be noted that, by implementation of the plate 270, the illuminating beam 216 can be adjusted to be perpendicularly incident to the X plate 250 but not the incident by an non-perpendicular angle in the conventional situation. As a result, the process of grading coating film on the X plate 250 in the invention only needs the grading coating film in single axis. It is not necessary to form the grading coating film in two axes. Fabrication of the X plate 250 is easier and cost is effectively reduced.

Still referring to FIG. 2 and FIG. 3, the reflected illuminating beam 220(r, g, b), which has been reflected by the plate 270, travels along the light path 222(r, g, b) and reaches to the plate 280. The illuminating beam 224(r, g, b) reflected by the plate 280 then travels along the light path 226(r, g, b) through the field lens 240(r, g, b) and reaches to the reflective displaying device 208(r, g, b). Then, the illuminating beam 224(r, g, b) is modulated by the reflective displaying device 208(r, g, b) to produce the image-formation beam 228(r, g, b), which is reflected and travels along the light path 230(r, g, b), and then reaches to the color cube 260. It should be noted that, as shown in FIG. 3 at top view, the light path 222(r, g, b), the light path 226(r, g, b), and the light path 230(r, g, b) are at the same cross-sectional plane (perpendicular to the top view drawing) in overlapping. However, for easy understanding, the three light paths are shown in separated lines in FIG. 3, not on the same plane.

Wherein, the field lens 206(r, g, b) is disposed adjacent to the reflective displaying device 208(r, g, b). The field lens 206(r, g, b) allows the illuminating beam 224(r, g, b) to enter the reflective displaying device 208(r, g, b) by a reduced light cone angle (not shown), so as to further reduce the aberration. The field lens 206(r, g, b) also allows the image-formation beam 228(r, g, b) to be adjusted, so that the light path 230(r, g, b) is consistent with the optical axis of the projecting lens set 214.

The reflective displaying device 208(r, g, b) includes, for example, a reflection-type liquid crystal display (LCD) device, and is controlled by a control system from, for example, computer or a video signal source (not shown). The reflective displaying device 208(r, g, b) can modulate illuminating beam 224(r, g, b) at the selected portion in polarization state for forming the image-formation beam 228(r, g, b).

The plate 280 is disposed on the light path 230(r, g, b) between the projection lens set 214 and the reflective displaying device 208, wherein the plate 280 can tilt form the light path 230(r, g, b) by an acute angle θ (as shown in FIG. 2) in a range of greater than 0° and less than 45°. The plate 280 has the function for processing polarization and adjusting the compensation. In the embodiment, the plate 280 can reflect the illuminating beam 220(r, g, b) with the first polarization state from the plate 270 but allow the image-formation beam 228(r, g, b) from the reflective displaying device 208(r, g, b) to pass. The image-formation beam 228(r, g, b) is also adjusted and compensated to reduce the aberration. The plate 280 includes, for example, glass plate, polarization plate, or any element capable perform the foregoing function.

It should be noted that, by the implementation of the plate 280 (having three plates respectively on the light paths 230(r, g, b)), the image-formation beams 228(r, g, b) can be separately adjusted and compensated. Since the fabrication to implement the plates 280 on light paths 230(r, g, b) is not difficult, in comparison with the conventional assembly that the plates are assembled within the projecting lens set, the invention has easier fabrication process and low cost.

In addition, by adjusting the angle between the plate 280 and the light path 230(r, g, b), the reflective displaying device 208 can be parallel or with a small angle with the color cube 260. Also and, since the light cone angle of the light beam incident to the reflective displaying device 208 is relatively small, the issues of the aberration, the image clarity, the pixel dispersion, uniformity and the contrast can be solved, and the image quality is then improved.

Furthermore, an analyzer 210(r, g, b) can be implemented on the light path 230(r, g, b) between the reflective displaying device 208(r, g, b) and the color cube 260. The analyzer 210(r, g, b) includes, for example, a linear polarizing plate, so as to allow the projection system can be at least operated between two different modes. For example, according to the situation whether or not the analyzer 210(r, g, b) and the transmission line of the polarizing plate 204(r, g, b) are parallel or perpendicular, it is % determined that the image-formation beam to pass for the portion with modulation or the portion without modulation. However, since the plate 280 of the invention has the function to process polarization, function of the analyzer 210(r, g, b) can be replaced by properly design the plate 280.

In FIG. 2 and FIG. 3, the image-formation beam 228(r, g, b), incident to the color cube 260, is combined by the color cube 260 to form the color image-formation beams 228. The image-formation beams 228 enters the projecting lens set 214, and the projecting lens set 214 receives and focuses the image-formation beams 228, and the project an image to a displaying surface (not shown).

In the foregoing embodiment, the reflective displaying device use the reflection-type LCD. However, the invention is not limited to this application. Another type of displaying device with variable planar device can be used to replace the reflective displaying device. In addition, the color splitter is not limited to the X plate. An X cube can, for example, replace the X plate.

Moreover, in the foregoing embodiment, The plate 270 and the plate 280 can be considered as a plate set. It has been sufficient in function for the plate set that the plate set to allow the split color beams to respectively enter the related reflective displaying device after the light beam is perpendicularly entering the X plate. The plate 280 is not necessary to be always disposed on the light path between the projection lens set and the reflective displaying device. The number of plates in the plate set can also be changed according to the actual design.

In conclusions, the invention at least has the advantages as follows:

In the invention, since the plate 280 is implemented between the reflective displaying device and the projection lens set, the illuminating beam is incident to the plate 280 and is reflected to the reflective displaying device. As a result, the light cone angle for the illuminating beam to enter the reflective displaying device is further reduced. This can solve the issues of aberration, image clarity, pixel dispersion, brightness uniformity, and contrast, and further improve the image quality.

In the invention, since the plate 280 is implemented between the reflective displaying device and the projecting lens set, and the plate 280 is disposed on the light path of the image-formation beam, the plate 280 can effectively reduce the aberration in the image-formation beam.

In the invention, the plate 280 is implemented on the light path between the reflective displaying device and the projecting lens set. Since it is not difficult to fabricate the plate 280 between the reflective displaying device and the projecting lens set, and it is not necessary to assemble the plate 280 in the projecting lens set, the lens design and fabrication for the projecting lens set is rather easy. The fabrication cost is then reduced.

In the invention, since the invention implements the plate 280 on the light path between the reflective displaying device and the projecting lens set, the amplification power of the field lens can be reduced. The variation of amplification power at the corner of image can be then reduced. This allows the adjustment at the corner of image to be easily done.

Further still, the invention implements the plate set, such as the plate 270 and the plate 280, on the light path between the reflective displaying device and the projecting lens set. Due to the plate set, the illuminating beam can be adjusted to be perpendicularly incident to a plane of the X plate. As a result, the process of grading coating film on the X plate only needs the coating film in a single axis direction. This makes the fabrication of the X plate to be easier and the cost to be reduced.

Further still, the invention implements the plate set between the reflective displaying device and the projecting lens set. Due to the plate set, the light path of the illuminating beam in the perpendicular direction to the image projection system can be folded. This makes the volume of the image projection system be reduced.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An off-axis image projection system, comprising;
    an illuminating source, emitting an illuminating beam;
    a color splitter, for splitting the illuminating beam into a plurality of color illuminating beams;
    a plurality of reflective displaying devices, respectively receiving and modulating the color illuminating beams to form a plurality of color image-formation beams;
    a projecting lens set, wherein light paths exist between the projecting lens and the reflective displaying devices;
    a color combining device, implemented between the reflective displaying devices and the projecting lens set, for combining the color image-formation beams to form an image-formation beam to enter the projecting lens set along the light paths; and
    a plurality of plate sets, respectively implemented between the projecting lens set and the reflective displaying devices, wherein the plate sets respectively reflect the color illuminating beams to the reflective displaying devices by a non-zero incident angle.

2. The off-axis image projection system of claim 1, wherein each of the plate sets comprises:
    a first plate; and
    a second plate;
    wherein the color illuminating beams are respectively incident to the second plates, reflected to the first plates by the second plates, and reflected to the reflective displaying devices by the first plates.

3. The off-axis image projection system of claim 2, wherein the first plates are respectively implemented on the related light paths between projecting lens set and the reflective displaying devices, and the color image-formation beams travel through the first plates and reach to the color combining device.

4. The off-axis image projection system of claim 3, an included acute angle for each between the first plates and the light paths is in a range of greater than 0° and less than 45°.

5. The off-axis image projection system of claim 1, further comprising a plurality of field lenses, wherein the field lenses are respectively adjacent to the reflective displaying devices, wherein the illuminating beams are respectively incident to the reflective displaying devices through the field lenses, and the reflected image-formation beams travel out through the related field lenses.

6. The off-axis image projection system of claim 1, further comprising:
    a plurality of polarizing plates, relating to the reflective displaying devices, and respectively implemented between the illuminating source and the related reflective displaying devices; and
    a plurality of analyzers, relating to the reflective displaying devices, and respectively implemented between the color combining device and the related reflective displaying devices.

* * * * *